(12) United States Patent
Hirano et al.

(10) Patent No.: US 8,599,699 B2
(45) Date of Patent: Dec. 3, 2013

(54) COMMUNICATION SYSTEM, RESOURCE MANAGEMENT DEVICE, WIRELESS BASE STATION AND WIRELESS COMMUNICATION TERMINAL

(75) Inventors: Jun Hirano, Kanagawa (JP); Takahisa Aoyama, Kanagawa (JP); Takashi Aramaki, Osaka (JP); Takako Hori, Kanagawa (JP); Yoshikazu Ishii, Kanagawa (JP)

(73) Assignee: Panasonic Corporation, Osaka (JP)

( * ) Notice: Subject to any disclaimer, the term of this patent is extended or adjusted under 35 U.S.C. 154(b) by 182 days.

(21) Appl. No.: 12/746,151

(22) PCT Filed: Dec. 4, 2008

(86) PCT No.: PCT/JP2008/003589
§ 371 (c)(1),
(2), (4) Date: Jun. 3, 2010

(87) PCT Pub. No.: WO2009/072286
PCT Pub. Date: Jun. 11, 2009

(65) Prior Publication Data
US 2010/0271966 A1    Oct. 28, 2010

(30) Foreign Application Priority Data

Dec. 5, 2007   (JP) .................................. 2007-314977

(51) Int. Cl.
*H04L 12/26* (2006.01)
(52) U.S. Cl.
USPC .......................................................... 370/239
(58) Field of Classification Search
None
See application file for complete search history.

(56) References Cited

U.S. PATENT DOCUMENTS

| 2003/0189912 | A1 | 10/2003 | Laitinen |
| 2004/0127191 | A1* | 7/2004 | Matsunaga .................. 455/403 |
| 2005/0176432 | A1 | 8/2005 | Kamura |
| 2006/0293042 | A1 | 12/2006 | Hosokawa |
| 2007/0293233 | A1* | 12/2007 | Inoue et al. .................. 455/450 |

FOREIGN PATENT DOCUMENTS

| JP | 2003-219449 | 7/2003 |
| JP | 2005-130473 | 5/2005 |
| JP | 2005-522087 | 7/2005 |
| JP | 2007-208784 | 8/2007 |
| WO | 2004/057903 | 7/2004 |

OTHER PUBLICATIONS

International Search Report dated Mar. 17, 2009.

(Continued)

*Primary Examiner* — Minh-Trang Nguyen
(74) *Attorney, Agent, or Firm* — Dickinson Wright PLLC

(57) ABSTRACT

Disclosed is a technique of efficiently collecting communication quality information with excellent responsiveness in wireless resource management. According to the technique, a RRM 110 distributes measurement content information showing measurement contents for recognizing a wireless communication status to each AP 230, and each AP stores the measurement content information. For example, to recognize a wireless resource use status of an AP, the RRM transmits trigger transmission instruction information to an eNB 150, as a result of which trigger information is transmitted throughout a communication area of the eNB. A UE 301 that has received the trigger information acquires the measurement content information from an AP (for example, AP_a 230a) to which it is connected, and performs a measurement process and reports a measurement result to the RRM via the eNB based on the measurement content information.

15 Claims, 8 Drawing Sheets

(56) References Cited

OTHER PUBLICATIONS

3GPP TR 23.882 Version 1.9.0, "3rd Generation Partnership Project; Technical Specification Group Services and System Aspects; 3GPP System Architecture Evolution: Report on Technical Options and Conclusions," Mar. 2003, pp. 1-184.

3GPP TR 36.938 Version 0.3.0, "3rd Generation Partnership Project; Technical Specification Group Radio Access Network; Improved Network Controlled Mobility between E-UTRAN and 3GPP2/Mobile WiMAX Radio Technologies," Aug. 2007, pp. 1-22.

3GPP TS 34.121 Version 6.3.0, "3rd Generation Partnership Project; Technical Specification Group Radio Access Network; Terminal conformance specification; Radio transmission and reception (FDD) (Release 6)," Dec. 2005, pp. 1-739, p. 2, Line 9.

Japanese Office Action dated Jun. 25, 2013.

* cited by examiner

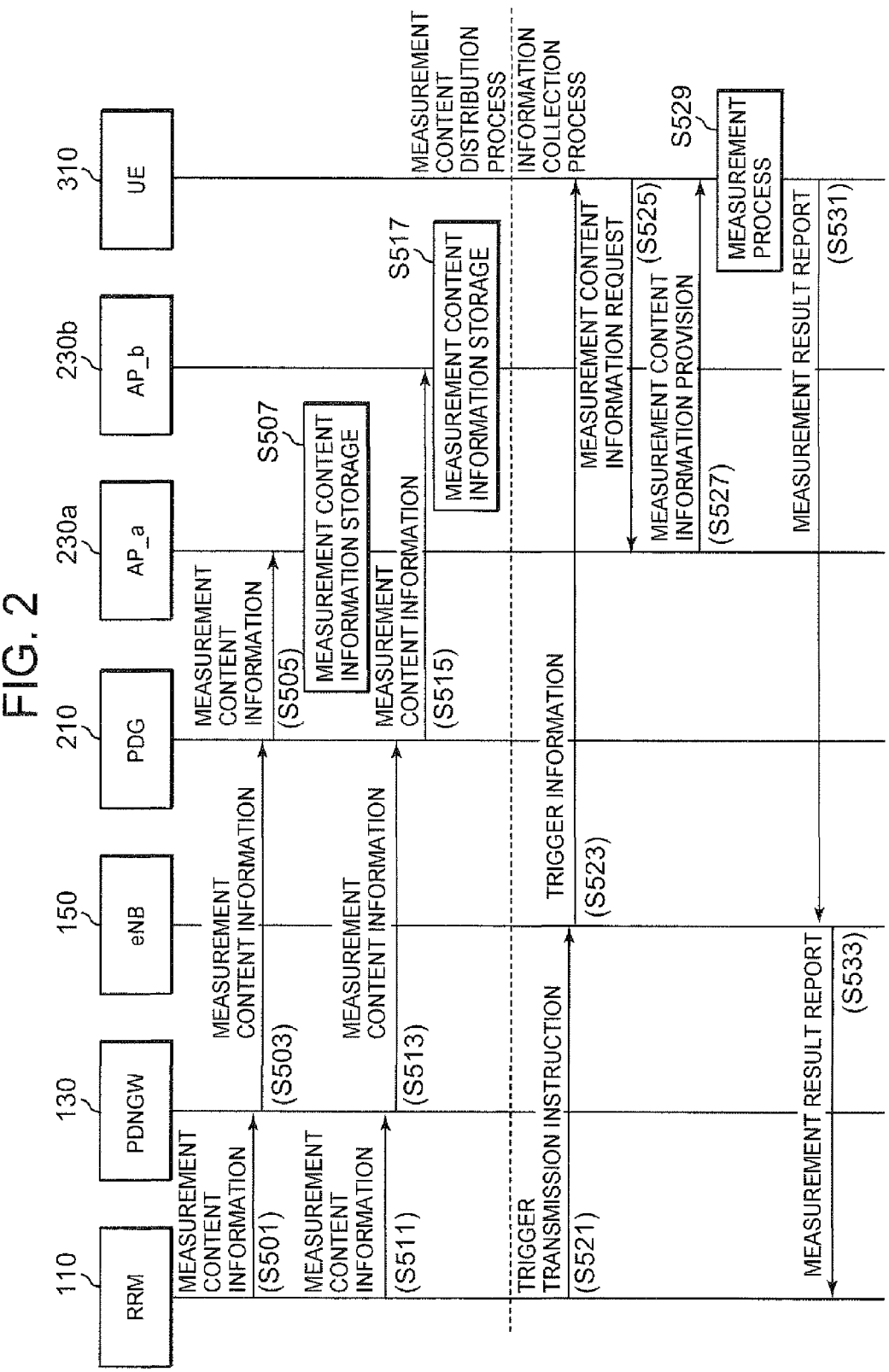

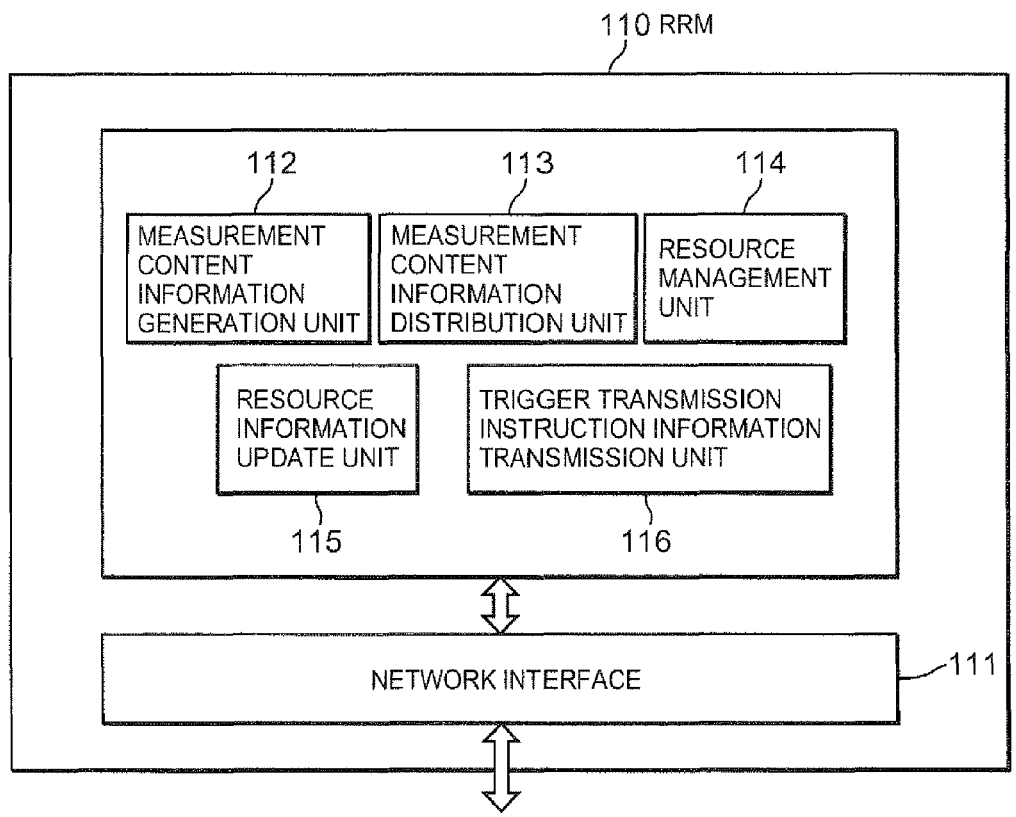
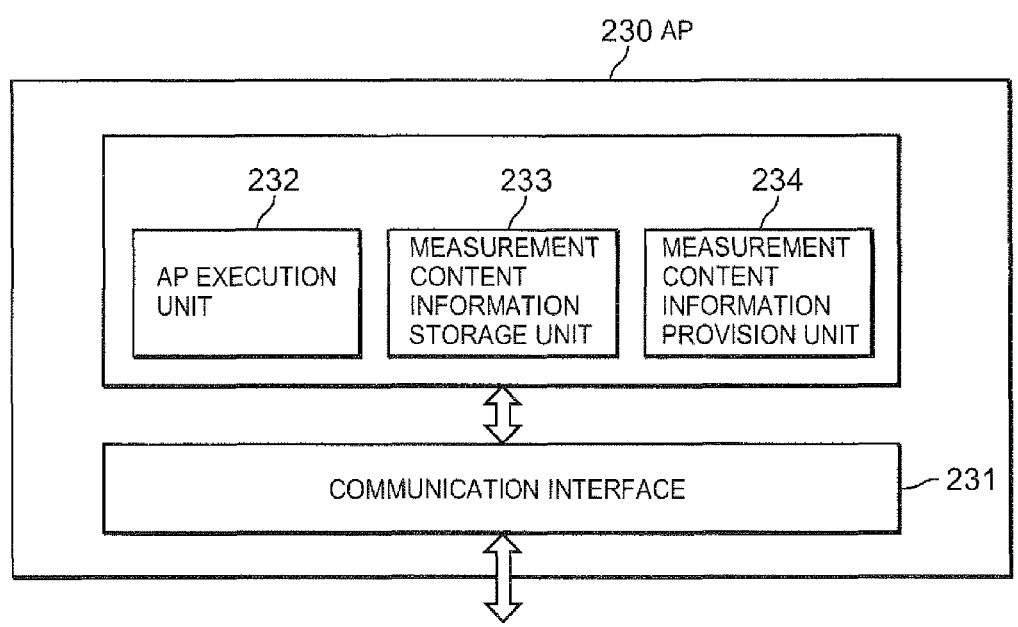

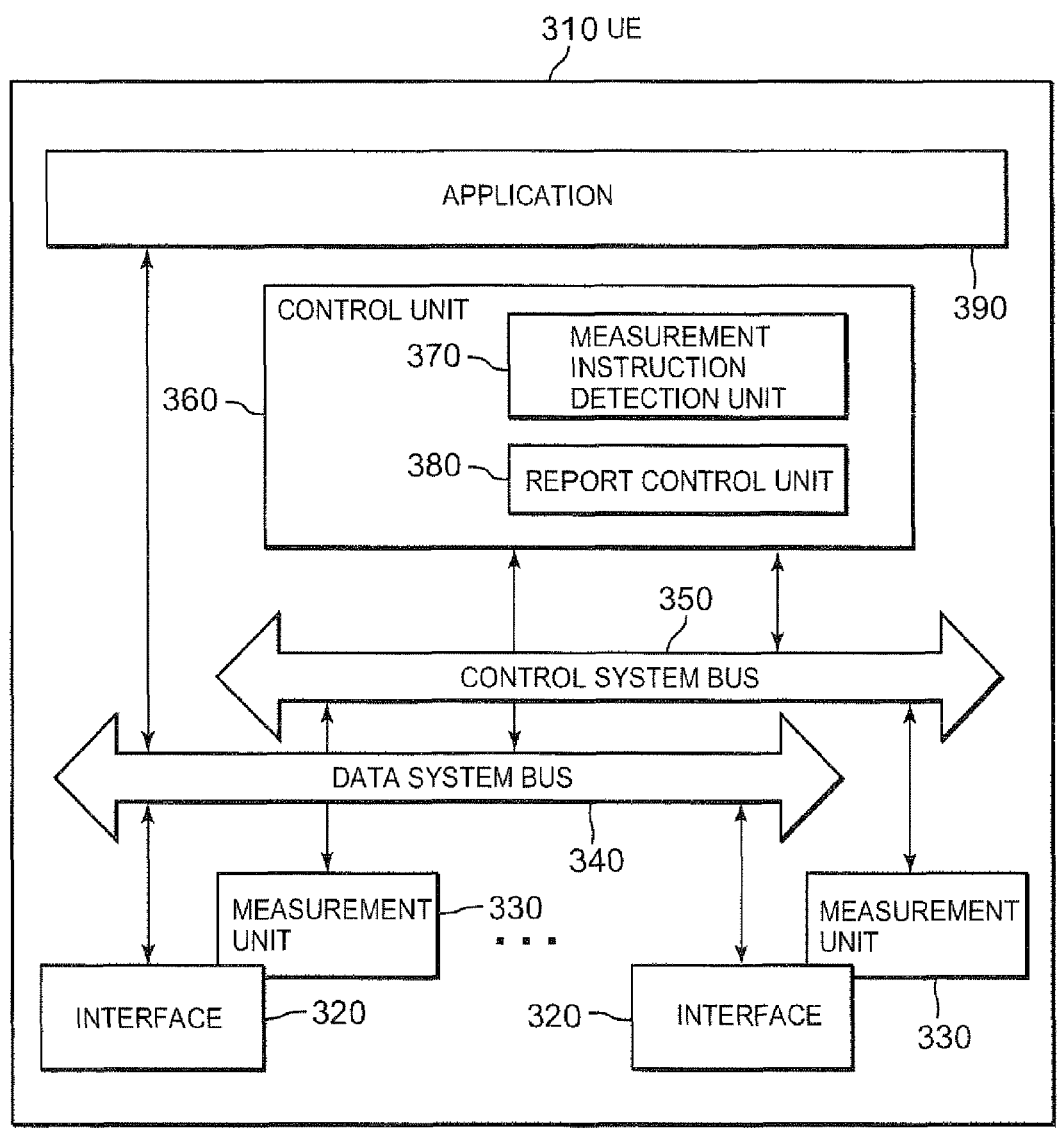

COMMUNICATION SYSTEM, RESOURCE MANAGEMENT DEVICE, WIRELESS BASE STATION AND WIRELESS COMMUNICATION TERMINAL

TECHNICAL FIELD

The present invention relates to a communication system in which wireless resource management is performed according to a wireless communication status of a wireless base station functioning as a connection point in wireless communication, and to a resource management device, a wireless base station, and a wireless communication terminal.

BACKGROUND ART

Currently, there is a wireless communication terminal connectable to a plurality of different types of networks, as the wireless communication terminal is provided with a wireless communication function such as cellular communication where a medium-to-long-distance service area is covered by one base station, a wireless LAN (Local Area Network) function with a relatively short-distance service area, and the like.

As a network formed by such a plurality of different types of networks, Third Generation Partnership Project (3GPP) conducts discussion on a wireless communication terminal, as well as its relevant communication technology, that has a function of communicating with various different types of networks such as a wireless LAN, a cellular network (3G network), and a wireless wide area network (WWAN) of WiMAX type. Especially, discussion is conducted on such a heterogeneous network aimed at achieving seamless mobility, supporting a plurality of application services required of high QoS (Quality of Service) such as real-time video, VoIP, and valuable data, and the like.

Moreover, as an example, non-patent document 1 listed below discloses a technique of Radio Resource Management (RRM) in 3GPP. In 3GPP, it is possible to, for example, monitor/manage resources used in a wireless base station. This enables communication that efficiently uses resources to be realized.

Furthermore, patent document 1 listed below discloses a mobile node that constantly monitors network quality by performing measurement based on field intensity and wireless bandwidth, and executes handover control according to a state of network quality.

Patent Document 1: International Patent Application Publication WO 2004/057903

Non-patent Document 1: "3rd Generation Partnership Project: Technical Specification Group Radio Access Network; Terminal conformance specification; Radio transmission and reception (FDD) (Release 6)", 3GPP TS 34.121 v6.3.0, December 2005

3GPP allows for integrated management of a heterogeneous network. For instance, an administrator of a 3G network further manages a wireless LAN, enabling to offer a service of providing a connection point to a wireless communication terminal using a heterogeneous network that combines the 3G network and the wireless LAN.

For example, as shown in FIG. 7, a Packet Data Gateway (PDG) 210 of a wireless LAN 200 is connected to a Packet Data Network Gateway (PDNGW) 130 of a 3G network 100, where the 3G network 100 has a trust relationship with the wireless LAN 200.

Moreover, the 3G network 100 has an evolved Node B (eNB) 150 (only one node is shown in FIG. 7) that functions as a connection point to a wireless communication terminal (hereafter referred to as a UE) 310, and the wireless LAN 200 has an AP (three APs that are AP_a 230a, AP_b 230b, and AP_c 230c are shown in FIG. 7, hereafter also referred to as an AP 230) that functions as a connection point to the UE 310. The UE 310 has, for example, both a 3G network interface connectable to the eNB 150 of the 3G network and a wireless LAN interface connectable to the AP 230 of the wireless LAN 200.

Note that, a communication area (cell) 160 of the eNB 150 is typically wider than communication areas 240a, 240b, and 240c (hereafter the plurality of communication areas are also collectively referred to as a communication area 240) of the APs 230. Besides, the communication area 160 of the eNB 150 and the communication area 240 of the AP 230 are situated so as to overlap each other.

A wireless resource management entity (hereafter simply referred to as a RRM) 110 present in the 3G network 100 is a communication device (or one functional entity within a device) capable of monitoring/recognizing wireless resources of the eNB 150 and managing the resources so as to achieve appropriate and efficient resource use. When the 3G network 100 connects to the wireless LAN 200 under its control, there are cases where it is desirable that the RRM 110 can manage wireless resources of the AP 230 functioning as a network connection point, as with the eNB 150.

In such a case, for example, through the following operation shown in FIG. 8, each UE 310 measures a wireless communication status relating to an AP 230 to which the UE 310 is connected and reports the measured wireless communication status to the RRM 110, as a result of which the RRM 110 can recognize a wireless resource use status of each AP 230. Here, the RRM 110 does not necessarily select and instruct a specific UE 310. For instance, a UE 310 suitable for wireless communication status measurement is selected by each AP 230, or an instruction is simply made to all instructible UEs 310. Besides, a UE 310 merely operates upon receiving a report instruction, and does not necessarily know that the RRM 110 is a transmitter of the instruction and a destination of the report.

In FIG. 8, the RRM 110 transmits information (quality report instruction information) instructing to report communication quality information (a wireless communication status with the AP 230) (step S1001). This is eventually notified as a quality report instruction to the UE 310 (though only one UE 310 is shown in the drawing, the notification may be made to a plurality of UEs 310). The quality report instruction information includes information instructing to measure the wireless communication status with the AP 230 and report a result of the measurement, and contents (measurement items) to be specifically measured. The quality report instruction information is delivered from the RRM 110 to the UE 310 via the PDNGW 130, the PDG 210, and the AP 230 to which the UE 310 is connected (steps S1003, S1005, and S1007).

The UE 310 performs a measurement process according to the measurement contents included in the quality report instruction information (step S1009), and transmits measurement result information including a result of the measurement to the RRM 110 via the AP 230 (step S1011). The measurement result information is delivered from the UE 310 to the RRM 110 via the AP 230 to which the UE is connected, the PDG 210, and the PDNGW 130 (steps S1013, S1015, and S1017). The RRM 110 can recognize current communication quality of the AP 230 from the measurement result information and perform resource adjustment of the AP 230. Likewise, when the RRM 110 collects wireless resources of the eNB 150, transmission/reception of quality report instruction information and measurement result information is performed via the eNB 150.

However, in the case where the RRM 110 manages wireless resources of the AP 230 according to the operation shown in FIG. 8, several problems arise.

For example, since the wireless communication status of the eNB 150 or the AP 230 varies moment by moment, the RRM 110 needs to collect communication quality information including such a wireless communication status promptly and stably. However, when collecting the communication quality information of the AP 230, the quality report instruction information and the measurement result information are transmitted on the wireless LAN 200 as shown in FIG. 8. The wireless LAN 200 predominantly offers a best-effort service, and so there is a problem that promptly collecting the communication quality information of the AP 230 is difficult (in particular, there is a lack of responsiveness in transmitting the measurement result information).

Meanwhile, it is also possible to notify the quality report instruction information relating to the AP 230, from the eNB 150. However, since the communication area of the eNB 150 covers an extremely wide range as compared with the communication area of the AP 230, notifying quality report instruction information in a wide range from the eNB 150 in order to recognize communication quality information of one particular AP 230 causes a waste of notification resources of the eNB 150. In other words, there is a problem that it is undesirable to use a wide range of notification resources in order to notify information useful only in a narrow range.

DISCLOSURE OF THE INVENTION

To solve the above-mentioned problems, the present invention has an object of providing a communication system, a resource management device, a wireless base station, and a wireless communication terminal for efficiently collecting communication quality information with excellent responsiveness in wireless resource management.

To achieve the stated object, the communication system according to the present invention is a communication system in which a first network and a second network are interconnected, the first network providing a wireless access link to a wireless communication terminal in a first communication area from a first wireless base station using a first wireless communication method, and the second network providing a wireless access link to a wireless communication terminal in a second communication area from a second wireless base station using a second wireless communication method, the second communication area overlapping the first communication area, wherein a resource management device installed in the first network is configured to provide measurement content information including measurement contents for measuring communication quality in the second wireless base station, to the wireless communication terminal via the second wireless base station, and when the resource management device collects communication quality information showing the communication quality of the second wireless base station, the resource management device is configured to transmit, to the wireless communication terminal, measurement instruction information instructing to start the measurement of the communication quality based on the measurement content information, and the wireless communication terminal that has received the measurement instruction information is configured to measure the communication quality based on the measurement content information acquired via the second wireless base station, and transmit the communication quality information including a result of the measurement to the resource management device via the first wireless base station. According to this structure, communication quality information can be collected efficiently with excellent responsiveness in wireless resource management.

Furthermore, in addition to the above-mentioned structure, in the communication system according to the present invention, the resource management device is configured to provide the measurement instruction information to the wireless communication terminal via the first wireless base station or the second wireless base station. According to this structure, it is possible to instruct the wireless communication terminal to start the communication quality measurement and report.

Furthermore, in addition to the above-mentioned structure, in the communication system according to the present invention, the second wireless base station is configured to store the measurement content information to be provided to the wireless communication terminal, and the wireless communication terminal is configured to acquire the measurement content information from the second wireless base station when receiving the measurement instruction information. According to this structure, communication quality information can be collected efficiently with excellent responsiveness in wireless resource management.

Moreover, to achieve the stated object, the resource management device according to the present invention is a resource management device installed in a first network in a communication system in which the first network and a second network are interconnected, the first network providing a wireless access link to a wireless communication terminal in a first communication area from a first wireless base station using a first wireless communication method, and the second network providing a wireless access link to a wireless communication terminal in a second communication area from a second wireless base station using a second wireless communication method, the second communication area overlapping the first communication area, the resource management device including: resource management means for managing wireless resources based on communication quality information of the first wireless base station and the second wireless base station; measurement content information generation means for generating measurement content information including measurement contents for measuring communication quality in the second wireless base station; measurement content information distribution means for providing the measurement content information generated by the measurement content information generation means, to the wireless communication terminal via the second wireless base station; measurement instruction means for, when updating the communication quality information of the second wireless base station managed in the resource management unit, transmitting measurement instruction information instructing to start measurement of the communication quality based on the measurement content information, to the wireless communication terminal via the first wireless base station; and communication quality information reception means for receiving the communication quality information of the second wireless base station from the wireless communication terminal via the first wireless base station, the communication quality information including a result of measuring the communication quality of the second wireless base station by the wireless communication terminal based on the measurement content information. According to this structure, communication quality information can be collected efficiently with excellent responsiveness in wireless resource management.

Furthermore, in addition to the above-mentioned structure, in the resource management device according to the present invention, the measurement content information generation means is configured to insert a unique value in the measurement content information. According to this structure, it is possible to set a unique value (for example, identification information of measurement content information) for specifying measurement content information.

Moreover, to achieve the stated object, the wireless base station according to the present invention is a wireless base station used as a first wireless base station in a communication system in which a first network and a second network are interconnected, the first network providing a wireless access link to a wireless communication terminal in a first communication area from the first wireless base station using a first wireless communication method, and the second network providing a wireless access link to a wireless communication terminal in a second communication area from a second wireless base station using a second wireless communication method, the second communication area overlapping the first communication area, the wireless base station including: connection point function implementation means for providing a wireless access link to the first network; and measurement instruction information transmission means for transmitting, based on an instruction from a resource management device, measurement instruction information to the wireless communication terminal connected via the wireless access link, the measurement instruction information instructing to start measurement of communication quality in the second wireless base station based on measurement content information including measurement contents for measuring the communication quality. According to this structure, it is possible to instruct the wireless communication terminal to start the communication quality measurement and report. Hence, communication quality information can be collected efficiently with excellent responsiveness in wireless resource management.

Moreover, to achieve the stated object, the wireless base station according to the present invention is a wireless base station used as a second wireless base station in a communication system in which a first network and a second network are interconnected, the first network providing a wireless access link to a wireless communication terminal in a first communication area from a first wireless base station using a first wireless communication method, and the second network providing a wireless access link to a wireless communication terminal in a second communication area from the second wireless base station using a second wireless communication method, the second communication area overlapping the first communication area, the wireless base station including: connection point function implementation means for providing a wireless access link to the second network; measurement content information storage means for storing measurement content information received from a resource management device installed in the first network, the measurement content information including measurement contents for measuring communication quality in the second wireless base station; and measurement content information provision means for, when the wireless communication terminal connected via the wireless access link requests the measurement content information, reading the measurement content information stored in the measurement content information storage means and providing the read measurement content information to the wireless communication terminal. According to this structure, communication quality information can be collected efficiently with excellent responsiveness in wireless resource management.

Furthermore, in addition to the above-mentioned structure, the wireless base station according to the present invention includes measurement instruction information transmission means for transmitting, based on an instruction from the resource management device, measurement instruction information to the wireless communication terminal connected via the wireless access link, the measurement instruction information instructing to start the measurement of the communication quality based on the measurement content information. According to this structure, it is possible to instruct the wireless communication terminal to start the communication quality measurement and report.

Moreover, to achieve the stated object, the wireless communication terminal according to the present invention is a wireless communication terminal used as a wireless communication terminal in a communication system in which a first network and a second network are interconnected, the first network providing a wireless access link to the wireless communication terminal in a first communication area from a first wireless base station using a first wireless communication method, and the second network providing a wireless access link to a wireless communication terminal in a second communication area from a second wireless base station using a second wireless communication method, the second communication area overlapping the first communication area, the wireless communication terminal including: wireless communication means connectable to each of the first wireless base station and the second wireless base station via a wireless access link; measurement content information acquisition means for acquiring measurement content information when receiving measurement instruction information from the first wireless base station or the second wireless base station, the measurement instruction information instructing to start measurement of communication quality in the second wireless base station based on the measurement content information including measurement contents for measuring the communication quality; measurement processing means for measuring the communication quality in communication with the second wireless base station, based on the measurement content information acquired by the measurement content information acquisition means; and measurement result information transmission means for transmitting communication quality information including a result of measuring the communication quality by the measurement processing means, to the first wireless base station. According to this structure, communication quality information can be collected efficiently with excellent responsiveness in wireless resource management.

Furthermore, in addition to the above-mentioned structure, the wireless communication terminal according to the present invention includes measurement content information storage means for receiving the measurement content information via the second wireless base station and storing the measurement content information beforehand, prior to the measurement of the communication quality by the measurement processing means, wherein the measurement content information acquisition means is configured to read the measurement content information from the measurement content information storage means, when receiving the measurement instruction information. According to this structure, communication quality information can be collected efficiently with excellent responsiveness in wireless resource management.

Furthermore, in addition to the above-mentioned structure, in the wireless communication terminal according to the present invention, the measurement content information acquisition means is configured to, when receiving the measurement instruction information, request the measurement content information from the second wireless base station, and receive the measurement content information from the second wireless base station as a response to the request. According to this structure, communication quality information can be collected efficiently with excellent responsiveness in wireless resource management.

Furthermore, in addition to the above-mentioned structure, in the wireless communication terminal according to the present invention, the communication quality information is transmitted to a resource management device in the first network via the first wireless base station. According to this structure, communication quality information can be collected efficiently with excellent responsiveness in wireless resource management.

Furthermore, in addition to the above-mentioned structure, in the wireless communication terminal according to the present invention, the measurement result information transmission means is configured to notify the communication quality information based on a communication quality information notification method designated in the measurement content information. According to this structure, communication quality information can be notified by an appropriate notification method.

Furthermore, in addition to the above-mentioned structure, in the wireless communication terminal according to the present invention, having referenced a condition included in the measurement instruction information, the measurement processing means is configured to perform a measurement process only when the referenced condition matches a condition of the wireless communication terminal. According to this structure, a specific wireless communication terminal can be subject to communication quality information collection.

Furthermore, in addition to the above-mentioned structure, in the wireless communication terminal according to the present invention, the wireless communication means is configured to switch connection from the first wireless base station to the second wireless base station, when receiving the measurement instruction information from the first wireless base station. According to this structure, for example, communication quality information can be collected efficiently from the wireless communication terminal that connects to a heterogeneous network by switching one wireless communication interface.

Furthermore, in addition to the above-mentioned structure, in the wireless communication terminal according to the present invention, the measurement result information transmission means is configured to insert a unique value designated by the measurement content information, in the communication quality information. According to this structure, correspondence between communication quality information and measurement content information referenced when generating the communication quality information can be specified easily.

Furthermore, in addition to the above-mentioned structure, the wireless communication terminal according to the present invention includes measurement content information determination means for determining, based on the received measurement instruction information, whether or not the measurement content information stored in the measurement content information storage means is appropriate for a measurement process to be currently performed. According to this structure, it is possible to determine whether or not the measurement content information is appropriate measurement content information (for example, most recent measurement content information).

With the provision of the above-mentioned structure, the present invention has an advantage of efficiently collecting communication quality information with excellent responsiveness in wireless resource management.

BRIEF DESCRIPTION OF THE DRAWINGS

FIG. 2 is a sequence chart showing an example of a preferred operation in the embodiment of the present invention.

FIG. 3 is a block diagram showing an example of a structure of a RRM in the embodiment of the present invention.

FIG. 4 is a block diagram showing an example of a structure of an AP in the embodiment of the present invention.

FIG. 5B is a block diagram showing another example of the structure of the UE in the embodiment of the present invention.

BEST MODES FOR CARRYING OUT THE INVENTION

The following describes an embodiment of the present invention with reference to drawings.

Figure 1:
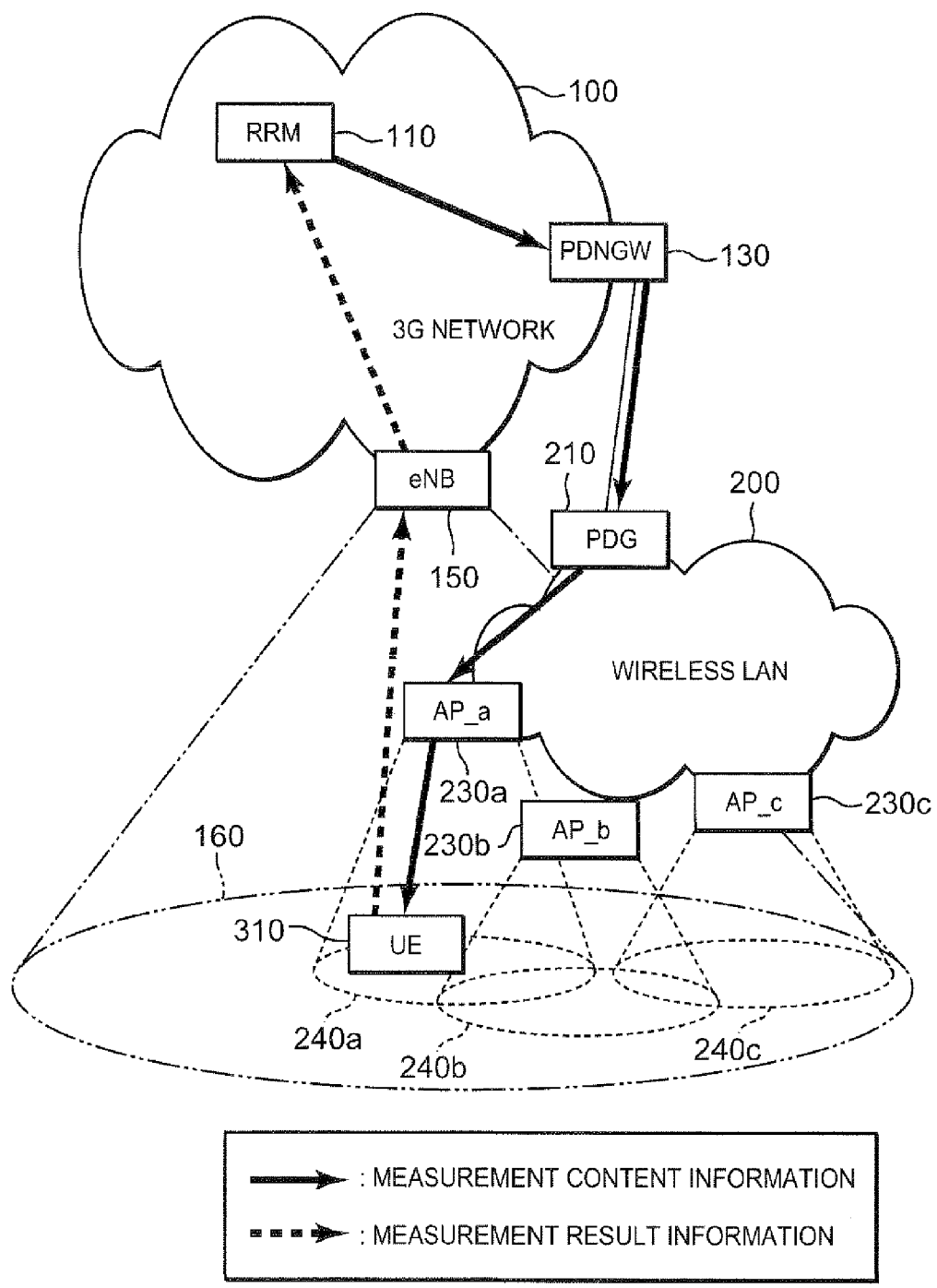
FIG. 1 is a view showing an example of a system structure and an example of measurement content information and measurement result information paths in an embodiment of the present invention.

A basic concept of the present invention is described first, with reference to FIG. 1. FIG. 1 is a view showing an example of a system structure and an example of measurement content information and measurement result information paths in the embodiment of the present invention.

Figure 7:
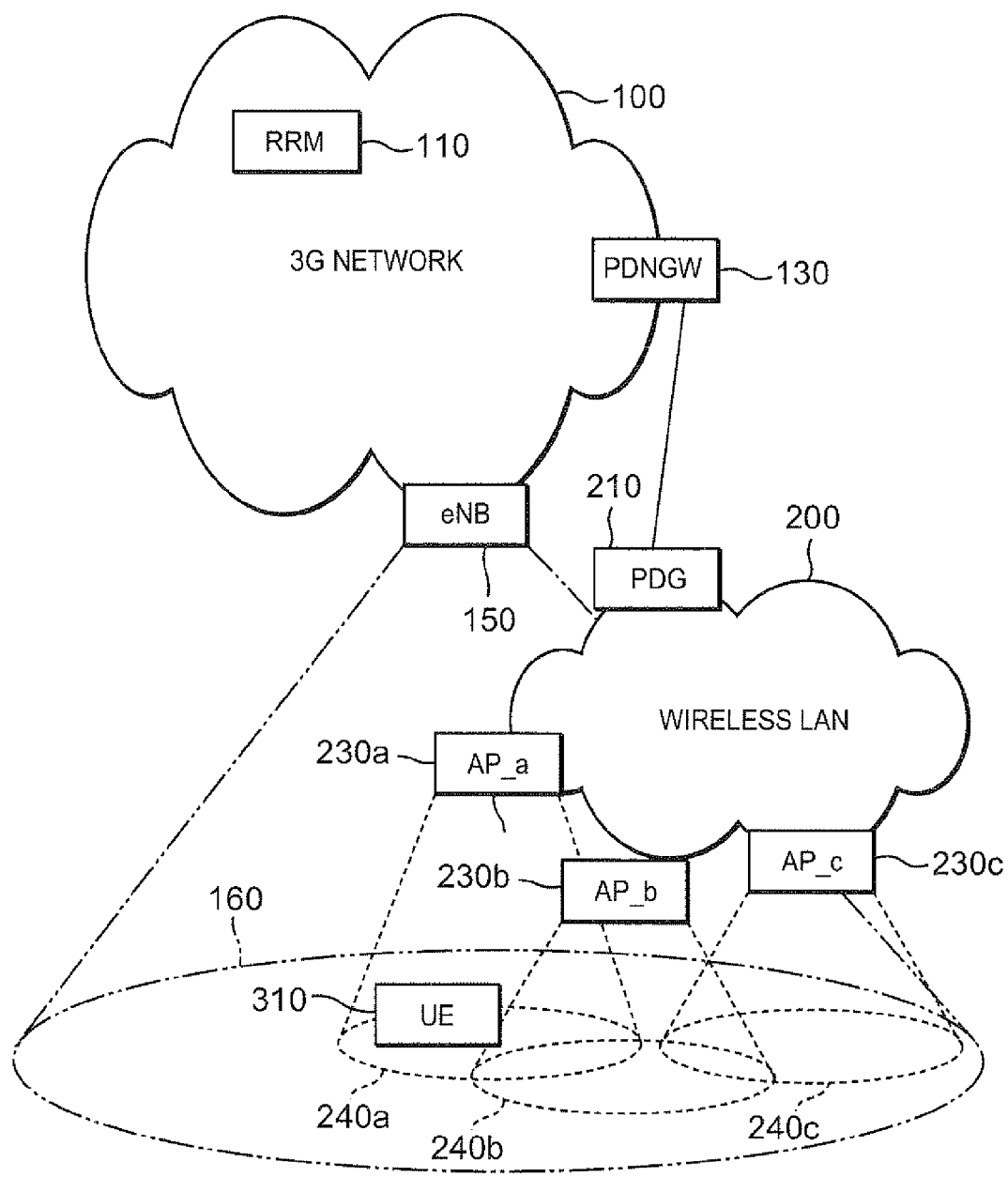
FIG. 7 is a view showing an example of a system structure in a conventional technique.
Figure 8:
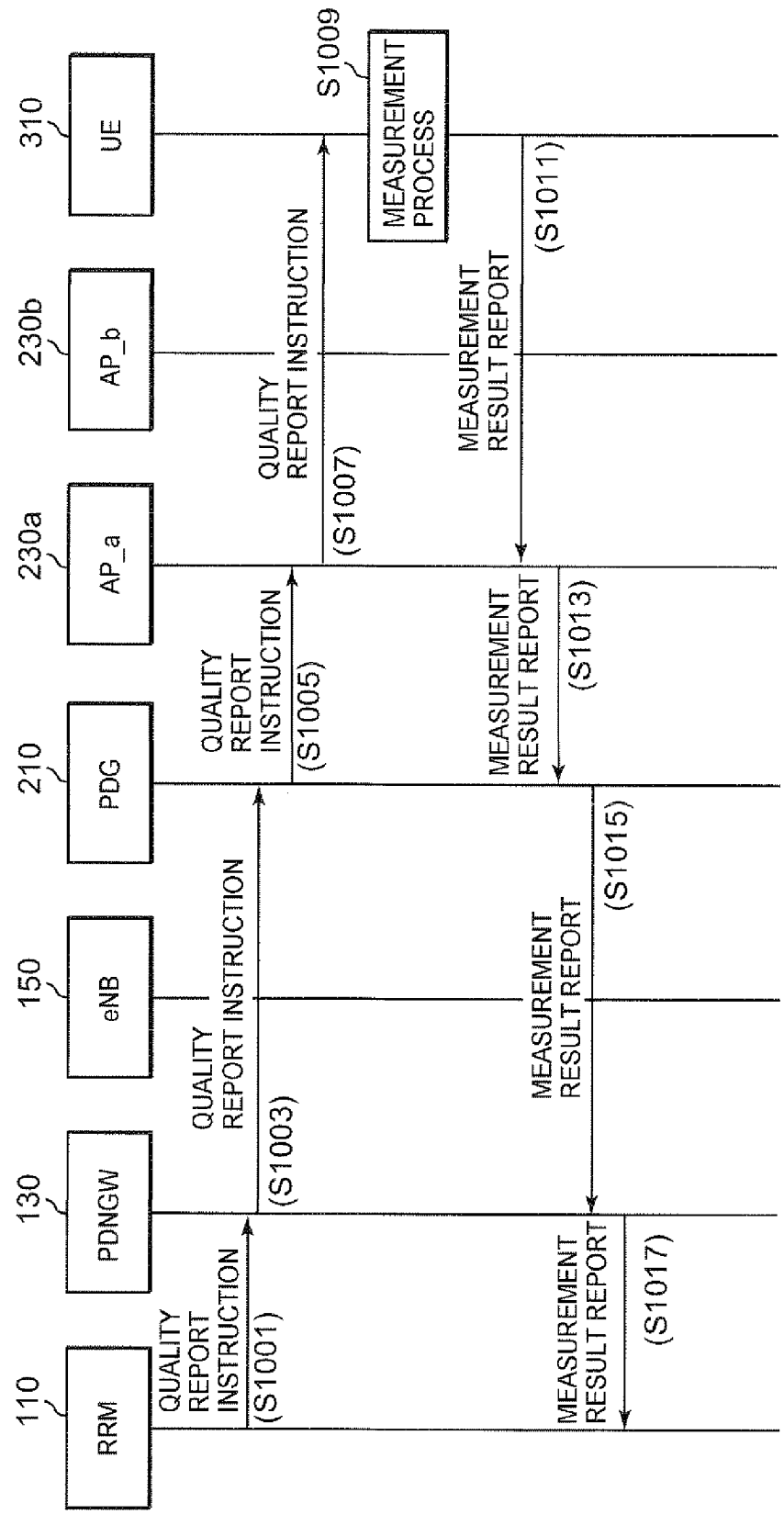
FIG. 8 is a sequence chart showing an example of an operation in the conventional technique.

The system structure shown in FIG. 1 is basically the same as the system structure shown in FIG. 7 mentioned above. That is, in FIG. 1 as in FIG. 7, the RRM 110, the PDNGW 130, and the eNB 150 are present in the 3G network 100, and the PDG 210 and the plurality of APs 230 (AP_a 230a, AP_b 230b, and AP_c 230c) are present in the wireless LAN (LAN connectable to a wireless LAN) 200. The wireless LAN 200 is under control of an administrator of the 3G network 100, and the PDG 210 is connected to the PDNGW 130. The eNB 150 functions as a connection point to the 3G network 100 for the UE 310, and the AP 230 functions as a connection point to the wireless LAN 200 for the UE 310. Note that the communication area 160 of the eNB 150 is typically wider than the communication areas 240a, 240b, and 240c of the APs 230. Besides, the communication area 160 of the eNB 150 and the communication area 240 of the AP 230 overlap each other. The UE 310 is configured to be connectable to both the eNB 150 and the AP 230. As an example, the UE 310 has both a 3G network interface and a wireless LAN interface.

In the present invention, the RRM 110 can provide measurement content information designating contents (measurement items) to be measured in the UE 310, to the UE 310 via the AP 230. In FIG. 1, the flow of measurement content information is indicated by solid arrows. This allows the RRM 110 to collect communication quality information for each AP 230 (a wireless communication status in each AP 230) (that is, to cause a UE 310 present under a specific AP 230 to perform a measurement process and report a result of the measurement). Here, the RRM 110 does not necessarily select the UE 310 beforehand, as the UE 310 consequently applies according to the AP 230 or the eNB 150. In the following description, however, this uncertainty is simplified, and it is assumed that there is the flow of communication from the RRM 110 to the UE 310 (that is selected as a result of some procedure). In other words, information transfer between the RRM 110 and the UE 310 is mediated by a relay device such as the AP 230 or the eNB 150, where the RRM 110 does not need to select or designate the UE 310 to be instructed to report a measurement result, and the UE 310 does not need to recognize that a report instruction is from the RRM 110.

As the measurement contents (measurement items) included in the measurement content information, various measurement items can be set according to information which the RRM 110 needs to collect. For instance, the measurement content information includes various information such as ID information of the measurement content information, measurement items such as reception power, an error rate, a congestion degree (the number of frames transmitted, a collision rate, and the like), a throughput, a QoS provision degree, and a frame collision rate in a RCH (random channel), and a measurement result information reply method (such as to the RRM, or to the eNB by a RRC message).

When the UE 310 performs the measurement process according to the measurement content information, measurement result information including a result of the measurement is transmitted from the UE 310 to the RRM 110 via the eNB 150. In FIG. 1, the flow of measurement result information is indicated by dotted arrows. Thus, the RRM 110 can perform measurement result collection with higher responsiveness and higher stability, when compared with the case of collecting measurement result information via a wireless LAN having a best-effort packet transmission method.

There are a plurality of methods for realizing the transmission paths of measurement content information and measurement result information shown in FIG. 1. The following describes, as a preferred method according to the present invention, a method whereby the UE 310, upon receiving trigger information from the eNB 150, reads measurement content information stored in the AP 230 and performs a measurement process, and reports measurement result information to the RRM 110 via the eNB 150.

FIG. 2 is a sequence chart showing an example of a preferred operation in the embodiment of the present invention. Note that the example of the preferred operation shown in FIG. 2 is based on the system structure shown in FIG. 1. The example of the preferred operation shown in FIG. 2 is roughly divided into a measurement content distribution process (a process shown in an upper tier of FIG. 2) and an information collection process (a process shown in a lower tier of FIG. 2).

In the measurement content distribution process shown in the upper tier of FIG. 2, a process whereby the RRM 110 distributes measurement content information to each AP 230 beforehand is performed. Having determined the contents of a wireless communication status to be collected in one AP 230 (for example, the AP_a 230*a*), the RRM 110 transmits measurement content information including the wireless communication status measurement items to the AP_a 230*a* (step S501). The measurement content information transmitted from the RRM 110 reaches the AP_a 230*a* via the PDNGW 130 and the PDG 210 (steps S503 and S505). Upon receiving the measurement content information, the AP_a 230*a* stores the measurement content information (step S507).

For instance, the RRM 110 is capable of performing measurement content determination and measurement content information distribution for each AP 230 individually. As an example, for an AP 230 (for example, the AP_b 230*b*) different from the above-mentioned AP_a 230*a*, the RRM 110 determines the contents of resource measurement relating to the AP_b 230*b* and transmits measurement content information including the determined measurement contents to the AP_b 230*b* in the same manner (steps S511, S513, and S515). The AP_b 230*b* stores the received measurement content information (step S517).

The measurement content distribution process may be performed so that measurement content information distribution is performed individually for each AP 230 as noted above. Alternatively, the measurement content distribution process may be performed so that measurement content information is simultaneously distributed to a plurality of APs 230 (or all APs 230) in the wireless LAN 200 and the plurality of APs 230 store the common measurement content information. Moreover, a timing of the measurement content distribution process is arbitrary, and so the RRM 110 can perform the measurement content distribution process at any time.

On the other hand, in the information collection process shown in the lower tier of FIG. 2, a process whereby the UE 310 performs a measurement process based on the acquisition of the measurement content information stored in the AP 230 in the measurement content distribution process and notifies measurement result information including a result of the measurement via the eNB 150 is performed. Having determined to collect communication quality information (a wireless communication status in the AP 230) of the AP 230, the RRM 110 transmits trigger transmission instruction information (information for requesting the eNB 150 to transmit trigger information) indicating measurement start, to the eNB 150 (step S521). Upon receiving the trigger transmission instruction information from the RRM 110, the eNB 150 transmits trigger information instructing to perform measurement based on the measurement content information and report a result of the measurement, to the UE 310 present in the communication area 160 (step S523).

There are several methods for trigger information transmission by the eNB 150. For example, the trigger information may be transmitted to all UEs 310 in the communication area 160 connected to the eNB 150 so as to cause all UEs 310 to perform the measurement process and report the measurement result. In such a case, for instance, by limiting the AP 230 to which the measurement content information is distributed, only the UE 310 connected under the specific AP 230 can acquire the measurement content information. This makes it possible to cause only the UE 310 connected under the specific AP 230 to perform the measurement process and report the measurement result.

Upon receiving the transmission start instruction information transmitted from the eNB 150, the UE 310 requests the measurement content information from the AP 230 (for example, the AP_a 230*a*) to which the UE 310 is connected via the wireless LAN interface (step S525). The AP_a 230*a* provides the stored measurement content information (measurement content information stored in step S507) to the UE 310, according to the measurement content information request by the UE 310 (step S527). The UE 310 performs the measurement process based on the measurement content information acquired from the AP_a 230*a* (step S529), and transmits a result of the measurement to the RRM 110 via the eNB 150 as measurement result information (steps S531 and S533). Here, the UE 310 may transmit the measurement result information directly to the RRM 110, or transmit the measurement result information to the eNB 150 which then passes the measurement result information to the RRM 110. Moreover, it is desirable that the UE 310 inserts, in the measurement result information, identification information of the measurement content information referenced in the measurement process, an ID (AP_ID) of the AP 230 (communication quality measurement target) to which the UE 310 is connected, and so on. The RRM 110 can perform resource management in each AP 230, based on such collected communication quality information of the AP 230.

Note that the trigger information transmitted from the eNB 150 to the UE 310 can be realized, for example, by a value of a flag of several bits (or one bit) included in a message (or a frame). In so doing, the use of notification resources in the eNB 150 can be minimized. That is, the UE 310 references the value of the flag in the message received from the eNB 150 and, when the flag is set to a value instructing measurement start, starts the process from step S525 onward.

A structure of each communication device (the RRM 110, the AP 230, the UE 310, and the eNB 150) for realizing the preferred operation (the sequence chart shown in FIG. 2) in the embodiment of the present invention is described next.

FIG. 3 is a block diagram showing an example of a structure of the RRM in the embodiment of the present invention. The RRM 110 shown in FIG. 3 includes: a network interface 111; a measurement content information generation unit 112 that generates measurement content information; a measurement content information distribution unit 113 that distributes (transmits) the measurement content information; a resource management unit 114 that performs resource management (in particular, resource management in the AP 230); a resource information update unit 115 that determines to update resource information (in particular, resource information in the AP) referenced by the resource management unit 114; and a trigger transmission instruction information transmission unit 116 that transmits trigger transmission instruction information to the eNB 150 based on the determination of the resource information update unit 115. Note that the RRM 110 may also include various functions (not shown in FIG. 3) other than the above-mentioned functions.

FIG. 4 is a block diagram showing an example of a structure of the AP in the embodiment of the present invention. The AP 230 shown in FIG. 4 includes: a communication interface 231 including a network interface connecting to a network side, a wireless communication interface for wireless communication with the UE 310 present in the communication area 240, and the like; an AP execution unit 232 that executes a function (a function of a conventional AP) of supporting/managing the UE 310 present in the communication area 240 and transferring a packet transmitted from the UE 310 or a packet transmitted to the UE 310. In addition, the AP 230 includes: a measurement content information storage unit 233 that stores measurement content information received from the RRM 110; and a measurement content information provision unit 234 that provides the measurement content information stored in the measurement content information storage unit 233 to the UE 310 in response to a request from the UE 310. Note that the AP 230 may also include various functions (not shown in FIG. 4) other than the above-mentioned functions.

Figure 5A:
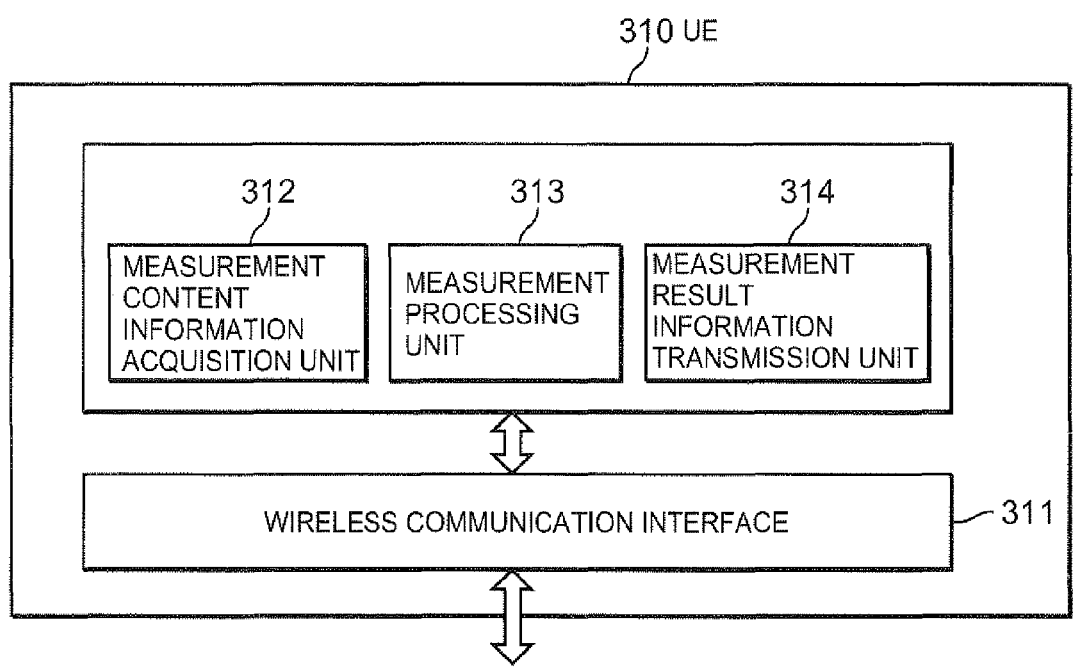
FIG. 5A is a block diagram showing an example of a structure of a UE in the embodiment of the present invention.

FIG. 5A is a block diagram showing an example of a structure of the UE in the embodiment of the present invention. The UE 310 shown in FIG. 5A includes: a wireless communication interface 311 including a 3G interface for connecting to the eNB 150 that provides a connection point to a network and performing communication, a wireless LAN interface for connecting to the AP 230 and performing communication, and the like; a measurement content information acquisition unit 312 that, when receiving trigger information from the eNB 150 via the 3G interface in the wireless communication interface 311, requests/acquires measurement content information from the AP 230 to which the UE 310 is connected via the wireless LAN interface in the wireless communication interface 311; a measurement processing unit 313 that performs a measurement process according to the measurement content information acquired from the AP 230 by the measurement content information acquisition unit 312; and a measurement result information transmission unit 314 that transmits a result of the measurement process by the measurement processing unit 313 to the network (eventually to the RRM 110) via the eNB 150 (via the 3G interface in the wireless communication interface 311) as measurement result information. Note that the UE 310 may also include various functions (not shown in FIG. 5A) other than the above-mentioned functions.

For example, when the UE 310 does not have measurement content information including a measurement condition or the UE 310 has only old measurement content information, it is desirable that the measurement content information acquisition unit 312 acquires appropriate (most recent) measurement content information. Moreover, it is desirable that, when generating the measurement result information, the measurement result information transmission unit 314 inserts identification information of the measurement content information referenced in the measurement process. Furthermore, it is desirable that, when a measurement result information reply method is designated in the measurement content information, the measurement result information transmission unit 314 reports the measurement result information by the reply method.

FIG. 5B is a block diagram showing another example of the structure of the UE in the embodiment of the present invention. FIG. 5B mainly shows an information process and flow in a data system and a control system in the UE 310. Though represented in a different manner, the UE 310 shown in FIG. 5B basically has the same structure and functions as the UE 310 shown in FIG. 5A.

The UE 310 shown in FIG. 5B includes: one or more interfaces 320 connectable to a plurality of access networks; a measurement unit that measures items specified by an instruction (measurement content information) from the network side according to a specified method; a control unit 360 connected to the interface 320 and the measurement unit 330 respectively via a data system bus 340 and a control system bus 350; and an application 390 that performs data transfer with the interface 320 through the data system bus 340. Note that the interface 320 may be a logical interface.

The control unit 360 includes: a measurement instruction detection unit 370 that detects reception of a measurement start instruction (trigger information) from the network side and controls the measurement by the measurement unit 330 based on the reception of the trigger information; and a report control unit 380 that controls to report, via the eNB 150, WLAN-side information (for example, information showing the wireless communication status with the AP 230 and the like) measured by a method according to the present invention.

The operation of the UE 310 differs depending on scenario. For instance, when the UE 310 is performing communication (or waiting for communication), the UE 310 detects information (trigger information) instructing to measure communication quality of the WLAN, in a control message on the 3G network side. In such a case, the UE 310 enables the interface relating to the connection to the WLAN, and acquires a list of measurement conditions and the like (measurement content information) based on the received notification information. The UE 310 then performs a measurement process in the interface of the WLAN, according to the measurement items (measurement conditions) written in the measurement content information. Having collected a measurement result, the UE 310 prepares a report message (measurement report information) including identification information of the list of measurement conditions and the like (identification information of the measurement content information), according to a method written in the list of measurement conditions and the like (measurement content information). The UE 310 transmits the message from the 3G-side interface.

Note that, when the list of measurement conditions and the like can be significantly identified on the network side, the identification information of the list of measurement conditions and the like is unnecessary, and instead there is a possibility that a unique identifier of the UE 310 is needed. There is also the case where the UE 310 needs to perform such control that operates the WLAN-side interface, in order to perform the measurement process in the WLAN-side interface. There is further the case where the UE 310 needs to actively request the list of measurement conditions and the like from the AP 230, rather than merely passively receiving the notification information including the list of measurement conditions and the like.

Moreover, the UE 310, upon receiving the measurement start instruction, may have already established the connection with the AP 230, or may have already acquired the list of measurement conditions and the like (for example, the list is in a state of being stored in an information storage unit in the UE 310). In this case, there is a possibility that it is necessary to check whether or not the already acquired list of measurement conditions and the like is a most recent list. Thus, various operations of the UE 310 that differ depending on scenario may be specified as a system beforehand, or may be instructed from the network side at each occasion by some method.

Figure 6:
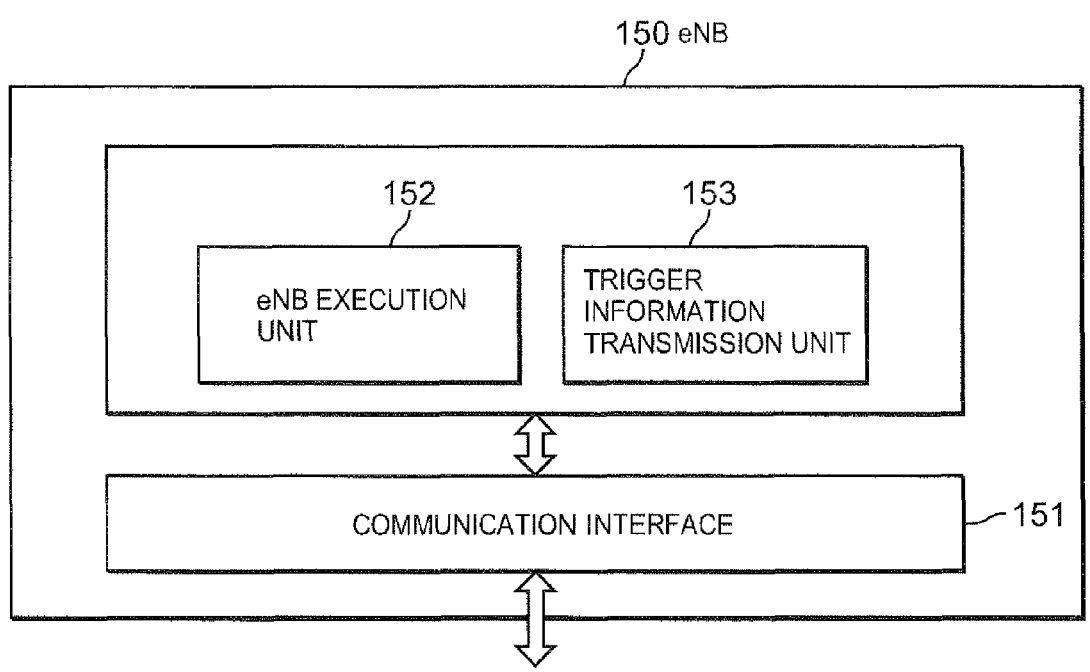
FIG. 6 is a block diagram showing an example of a structure of an eNB in the embodiment of the present invention.

FIG. 6 is a block diagram showing an example of a structure of the eNB in the embodiment of the present invention. The eNB 150 shown in FIG. 6 includes: a communication interface 151 including a network interface connecting to the network side, a wireless communication interface for performing wireless communication with the UE 310 present in the communication area 160, and the like; and an eNB execution unit 152 that executes a function (a function of a conventional eNB) of supporting/managing the UE 310 present in the communication area 160 and transferring a packet transmitted from the UE 310 or a packet transmitted to the UE 310. In addition, the eNB 150 includes a trigger information transmission unit 153 that, when receiving trigger transmission instruction information from the RRM 110, transmits trigger information to the UE 310 to which the eNB 150 is connected via the wireless communication interface 151. Note that the eNB 150 may include various functions (not shown in FIG. 6) other than the above-mentioned functions.

Since the communication devices (the RRM 110, the AP 230, the UE 310, and the eNB 150) respectively have the structures shown in FIGS. 3 to 6, the preferred operation in the embodiment of the present invention shown in FIG. 2 can be realized.

Note that there are various embodiments for realizing the present invention other than the above-mentioned embodiment of the present invention. The following describes various embodiments for realizing the present invention, in comparison with the above-mentioned embodiment of the present invention.

In the above-mentioned embodiment, the UE 310 acquires the measurement content information from the AP 230 by requesting the measurement content information from the AP 230, when receiving the trigger information from the eNB 150. As another embodiment, the UE 310 may acquire/store the measurement content information before receiving the trigger information from the eNB 150. For instance, the AP 230 may notify the UE 310 connected under the AP 230, of the measurement content information stored in its measurement content information storage unit beforehand (for example, at the time when the UE 310 connects to the AP 230). This allows the UE 310 to perform the measurement process and report the measurement result information without performing the measurement content information acquisition process (steps S525 and S527 in FIG. 2), after receiving the trigger information from the eNB 150. As a result, a time period from when the RRM 110 transmits the trigger transmission instruction information to when the RRM 110 acquires the measurement result information is shortened, which further contributes to improved responsiveness. For instance, the RRM 110 may provide the measurement content information to the AP 230 in such a manner that explicitly separates measurement content information to be stored in the AP 230 and measurement content information which can be notified from the AP 230 to the UE 310 beforehand. This makes it possible to separate information storage locations so that information is stored in the AP 230 for such an item that causes a communication bandwidth waste if notified at each occasion due to a frequent change with time and the like, and information is notified to the UE 310 beforehand for such an item that requires immediate measurement start when instructed. As an alternative, the measurement content information may be stored not in the AP 230 but in another arbitrary network node so that the UE 310 requests the measurement content information from this network node.

In the above-mentioned embodiment, the example of transmitting the trigger information to all UEs 310 in the communication area 160 connected to the eNB 150 is given as the trigger information transmission method by the eNB 150. However, the eNB 150 may instead transmit the trigger information only to a specific UE 310 (or a group of UEs 310) using a specific wireless communication channel or control signal. This allows the measurement process and the measurement result report to be performed with respect to only the specific UE 310. Moreover, the ID (AP_ID) of the AP 230 may be inserted in the trigger information to cause only the UE 310 connected (or connectable) to the AP 230 identified by the AP_ID to measure and report the communication quality in the AP 230. In this way, the RRM 110 can collect only the communication quality information relating to the AP 230 designated by the AP_ID.

In the above-mentioned embodiment, when transmitting the measurement content information to each AP 230, the RRM 110 can distribute common (same) measurement content information of each AP 230 to each AP 230 or distribute individual measurement content information of each AP 230 separately to each AP 230, and further the RRM 110 can distribute individual measurement content information of each UE 310 to the AP 230. In such a case, for example, the AP 230 can select measurement content information to be provided to the UE 310 which has received the trigger information and requested the measurement content information, and provide the measurement content information specific to the UE 310. Thus, it is possible to provide the measurement content information only to the specific UE 310 and cause only the specific UE 310 to perform the measurement process and report the measurement result.

Besides, by adding identification information to each of a plurality of pieces of measurement content information distributed from the RRM 110 and also inserting, in the trigger information transmitted from the eNB 150, identification information designating any of the plurality of pieces of measurement content information, it is possible to specify detailed items for which the UE 310 performs the measurement process and reports the measurement result. For example, the RRM 110 generates pieces of measurement content information (for example, pieces of measurement content information to which four different pieces of identification information A, B, C, and D are added) that each include a different measurement item set, and distributes these pieces of measurement content information to the AP_a 230a. The RRM 110 then transmits, for example, trigger transmission instruction information including the identification information "B" to the eNB 150, as a result of which the trigger information designating the identification information "B" is transmitted from the eNB 150. The UE 310 under the AP_a 230a, upon requesting measurement content information from the AP_a 230a, passes the identification information "B" included in the trigger information to the AP_a 230a. The AP_a 230a responsively passes the measurement content information of the identification information "B" to the UE 310, so that the UE 310 can perform the measurement process according to the measurement content information of the identification information "B" and report the measurement result to the RRM 110. Here, by using such identification information in order to simply distinguish measurement content information for each AP, for each time, or the like and explicitly stating, in the report from the UE 310, the identification information of the measurement content information based on which the report is made, the measurement result can be analyzed easily.

In the above-mentioned embodiment, the trigger information is transmitted from the eNB 150 to the UE 310 present in the communication area 160. However, the trigger information may instead be transmitted from the AP 230. In this case, for example, the RRM 110 may transmit the trigger transmission instruction information only to a specific AP 230 (for example, the AP_a 230a) so that the trigger information is transmitted only within the communication area 240a of the specific AP_a 230a. This makes it possible to cause only the UE 310 connected to the specific AP 230 to perform the measurement process and report the measurement result. Furthermore, when the AP 230 transmits the trigger information, the AP 230 may simultaneously provide the measurement content information to the UE 310. Thus, the trigger information and the measurement content information are provided only to the UE 310 present in the communication area 240 of the specific AP 230, enabling the UE 310 to promptly recognize the measurement contents and perform the measurement process without performing a process such as measurement content information request/acquisition.

Moreover, the measurement content information notification method may be an arbitrary method such as a method of notifying from the AP 230 as notification information, a method of notifying using a separate connection channel, a method of notifying measurement content information after requested by the UE 310, a method of periodically notifying measurement content information from the AP 230 to the UE 310, and so on.

Moreover, a notification data packet directed to the eNB 150, the RRM 110, or other network nodes may be used for the measurement result notification from the UE 310, and the measurement result may be transmitted using a control system communication channel as specific layer 2 message information.

In the case where the measurement does not need to be performed in all UEs 310 as a system, the list of measurement conditions and the like and the measurement start instruction may be notified to the individual UE 310. Even when notifying the measurement start instruction to all UEs 310, the measurement start instruction may be notified while adding such a condition that limits the UE 310 which regards the measurement start notification as valid and actually performs the measurement and report operation. For instance, only a UE 310 having an odd-numbered identifier may be subject to the measurement instruction, or only a UE 310 already connected to the AP 230 or a UE 310 currently in a wait state may be subject to the measurement instruction. Besides, such a condition according to which a UE 310 that uses one wireless unit by switching it does not need to perform the measurement may be added.

Moreover, when the measurement start instruction is made from the AP 230, the measurement instruction can be made only to the UE 310 already connected to the AP 230. However, for example, it is possible to perform such control that differs a measurement start timing for each AP 230.

Note that the various embodiments of the present invention including the above-mentioned embodiment may be used in combination.

The various embodiments of the present invention including the above-mentioned embodiment are described on the premise that the wireless communication interface 311 of the UE 310 is composed of a plurality of interfaces (for example, a 3G interface and a wireless LAN interface), but it is sufficient if a plurality of logical interfaces for realizing the present invention are available. For example, by sharing one wireless unit by a plurality of connection methods while switching at such a speed whose change is insignificant in terms of a network interface or by maintaining a logical link in layer 2, the same operation as in the case where a network unit is connected to networks via a plurality of interfaces may be achieved. Moreover, in the case where the present invention is applied to a wireless communication terminal that shares one wireless unit by a plurality of connection methods, when performing an operation of information collection (reporting the wireless communication status of the AP 230) on the wireless LAN 200 side, the UE 310 is connected not only to the wireless LAN 200 but also to the 3G network 100 side upon notifying the measurement result information, so that a break in cellular-side communication time can be reduced.

Though the UE 310 is described as connectable to the 3G network 100 and the wireless LAN 200 in this specification, communication can also be performed using WiMAX (IEEE 802.16), 3GPP2, WiFi (IEEE 802.11), and other wireless communication technologies. The present invention can be realized using such wireless communication technologies, too.

Though the drawings and the description are provided in this specification in consideration that the present invention achieves a most practical and preferred embodiment, it will be apparent for those skilled in the art that various changes may be made in detailed designs and parameters relating to various components without departing from the scope of the invention. For instance, the present invention is applicable to an arbitrary node (such as a home agent and other mobile nodes) that performs communication with a mobile node. The present invention is also applicable to any of a mobile host that operates mobile IP v6 and a mobile router that operates network mobility support.

Each functional block used in the above description of the embodiment of the present invention is typically implemented as LSI (Large Scale Integration) which is an integrated circuit. Each of the functional blocks may separately be implemented on one chip, or all or part of the functional blocks may be implemented on one chip. Though LSI is mentioned as the integrated circuit here, the integrated circuit may be called any of an IC (Integrated Circuit), system LSI, super LSI, or ultra LSI depending on the degree of integration.

Moreover, the integrated circuit method is not limited to LSI, and may be realized by a dedicated circuit or a general-purpose processor. A FPGA (Field Programmable Gate Array) that can be programmed after LSI manufacturing or a reconfigurable processor capable of reconfiguring connections and settings of circuit cells inside LSI may also be used.

Furthermore, when an integrated circuit technique that replaces LSI emerges from advancement of semiconductor technologies or other derivative technologies, such a technique can be used for the functional block integration. For instance, biotechnology may potentially be adapted in this way.

INDUSTRIAL APPLICABILITY

The present invention has an advantage of efficiently collecting communication quality information with excellent responsiveness in wireless resource management, and can be applied to a technique relating to wireless resource management according to a wireless communication status of a wireless base station that functions as a connection point in wireless communication.

The invention claimed is:

1. A communication system in which a first network and a second network are interconnected, the first network providing a wireless access link to a wireless communication terminal in a first communication area from a first wireless base station using a first wireless communication method, and the second network providing a wireless access link to a wireless communication terminal in a second communication area from a second wireless base station using a second wireless communication method, the second communication area overlapping the first communication area, wherein
a resource management device installed in the first network is configured to provide measurement content information including measurement contents for measuring communication quality in the second wireless base station, to the wireless communication terminal via the second wireless base station, and
when the resource management device collects communication quality information showing the communication quality of the second wireless base station, the resource management device is configured to transmit, to the wireless communication terminal, measurement instruction information instructing to start the measurement of the communication quality based on the measurement content information, and the wireless communication terminal that has received the measurement instruction information is configured to measure the communication quality based on the measurement content information acquired via the second wireless base station, and transmit the communication quality information including a result of the measurement to the resource management device via the first wireless base station,
wherein the resource management device is configured to provide the measurement instruction information to the wireless communication terminal via the first wireless base station.

2. The communication system according to claim 1, wherein the second wireless base station is configured to store the measurement content information to be provided to the wireless communication terminal, and the wireless communication terminal is configured to acquire the measurement content information from the second wireless base station when receiving the measurement instruction information.

3. A resource management device installed in a first network in a communication system in which the first network and a second network are interconnected, the first network providing a wireless access link to a wireless communication terminal in a first communication area from a first wireless base station using a first wireless communication method, and the second network providing a wireless access link to a wireless communication terminal in a second communication area from a second wireless base station using a second wireless communication method, the second communication area overlapping the first communication area, the resource management device comprising:
resource management means for managing wireless resources based on communication quality information of the first wireless base station and the second wireless base station;
measurement content information generation means for generating measurement content information including measurement contents for measuring communication quality in the second wireless base station;
measurement content information distribution means for providing the measurement content information generated by the measurement content information generation means, to the wireless communication terminal via the second wireless base station;
measurement instruction means for, when updating the communication quality information of the second wireless base station managed in the resource management unit, transmitting measurement instruction information instructing to start measurement of the communication quality based on the measurement content information, to the wireless communication terminal via the first wireless base station; and
communication quality information reception means for receiving the communication quality information of the second wireless base station from the wireless communication terminal via the first wireless base station, the communication quality information including a result of measuring the communication quality of the second wireless base station by the wireless communication terminal based on the measurement content information.

4. The resource management device according to claim 3, wherein the measurement content information generation means is configured to insert a unique value in the measurement content information.

5. A wireless base station used as a first wireless base station in a communication system in which a first network and a second network are interconnected, the first network providing a wireless access link to a wireless communication terminal in a first communication area from the first wireless base station using a first wireless communication method, and the second network providing a wireless access link to a wireless communication terminal in a second communication area from a second wireless base station using a second wireless communication method, the second communication area overlapping the first communication area, the wireless base station comprising:
connection point function implementation means for providing a wireless access link to the first network;
measurement instruction information transmission means for transmitting, based on an instruction from a resource management device, measurement instruction information to the wireless communication terminal connected via the wireless access link, the measurement instruction information instructing to start measurement of communication quality in the second wireless base station based on measurement content information including measurement contents for measuring the communication quality; and measurement result information reception means for receiving communication quality information including a result of measuring the communication quality, the communication quality being measured by the wireless communication terminal receiving the measurement instruction information via the first wireless base station based on the measurement content information acquired via the second wireless base station.

6. A wireless base station used as a second wireless base station in a communication system in which a first network and a second network are interconnected, the first network providing a wireless access link to a wireless communication terminal in a first communication area from a first wireless base station using a first wireless communication method, and the second network providing a wireless access link to a wireless communication terminal in a second communication area from the second wireless base station using a second wireless communication method, the second communication area overlapping the first communication area, the wireless base station comprising:

connection point function implementation means for providing a wireless access link to the second network;

measurement content information storage means for storing measurement content information received from a resource management device installed in the first network, the measurement content information including measurement contents for measuring communication quality in the second wireless base station; and measurement content information provision means for, when the wireless communication terminal connected via the wireless access link requests the measurement content information, reading the measurement content information stored in the measurement content information storage means and providing the read measurement content information to the wireless communication terminal, the wireless communication terminal receiving measurement instruction information instructing to start measurement of communication quality in the second wireless base station based on the measurement content information.

7. A wireless communication terminal used as a wireless communication terminal in a communication system in which a first network and a second network are interconnected, the first network providing a wireless access link to the wireless communication terminal in a first communication area from a first wireless base station using a first wireless communication method, and the second network providing a wireless access link to a wireless communication terminal in a second communication area from a second wireless base station using a second wireless communication method, the second communication area overlapping the first communication area, the wireless communication terminal comprising:

wireless communication means connectable to each of the first wireless base station and the second wireless base station via a wireless access link;

measurement content information acquisition means for acquiring measurement content information via the second wireless base station when receiving measurement instruction information from the first wireless base station, the measurement instruction information instructing to start measurement of communication quality in the second wireless base station based on the measurement content information including measurement contents for measuring the communication quality;

measurement processing means for measuring the communication quality in communication with the second wireless base station, based on the measurement content information acquired by the measurement content information acquisition means; and measurement result information transmission means for transmitting communication quality information including a result of measuring the communication quality by the measurement processing means, to the first wireless base station.

8. The wireless communication terminal according to claim 7, comprising measurement content information storage means for receiving the measurement content information via the second wireless base station and storing the measurement content information beforehand, prior to the measurement of the communication quality by the measurement processing means, wherein the measurement content information acquisition means is configured to read the measurement content information from the measurement content information storage means, when receiving the measurement instruction information.

9. The wireless communication terminal according to claim 7, wherein the measurement content information acquisition means is configured to, when receiving the measurement instruction information, request the measurement content information from the second wireless base station, and receive the measurement content information from the second wireless base station as a response to the request.

10. The wireless communication terminal according to claim 7, wherein the communication quality information is transmitted to a resource management device in the first network via the first wireless base station.

11. The wireless communication terminal according to claim 7, wherein the measurement result information transmission means is configured to notify the communication quality information based on a communication quality information notification method designated in the measurement content information.

12. The wireless communication terminal according to claim 7, wherein, having referenced a condition included in the measurement instruction information, the measurement processing means is configured to perform a measurement process only when the referenced condition matches a condition of the wireless communication terminal.

13. The wireless communication terminal according to claim 12, wherein the wireless communication means is configured to switch connection from the first wireless base station to the second wireless base station, when receiving the measurement instruction information from the first wireless base station.

14. The wireless communication terminal according to claim 7, wherein the measurement result information transmission means is configured to insert a unique value designated by the measurement content information, in the communication quality information.

15. The wireless communication terminal according to claim 8, comprising measurement content information determination means for determining, based on the received measurement instruction information, whether or not the measurement content information stored in the measurement content information storage means is appropriate for a measurement process to be currently performed.

* * * * *